United States Patent
Literman et al.

(10) Patent No.: US 11,602,973 B2
(45) Date of Patent: Mar. 14, 2023

(54) VEHICLE HVAC CONTROL SYSTEM AND METHOD

(71) Applicant: GM GLOBAL TECHNOLOGY OPERATIONS LLC, Detroit, MI (US)

(72) Inventors: Brian D. Literman, Shelby Township, MI (US); Jeffrey A. Bozeman, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 824 days.

(21) Appl. No.: 16/416,628

(22) Filed: May 20, 2019

(65) Prior Publication Data

US 2020/0369116 A1    Nov. 26, 2020

(51) Int. Cl.
*B60H 1/00* (2006.01)
*B60H 1/22* (2006.01)

(52) U.S. Cl.
CPC ..... *B60H 1/00735* (2013.01); *B60H 1/00021* (2013.01); *B60H 2001/006* (2013.01); *B60H 2001/2246* (2013.01)

(58) Field of Classification Search
CPC ...... B60H 2001/006; B60H 2001/2246; B60H 1/00735; B60H 1/00021; F24F 13/24; F04C 2270/12
USPC ....................................................... 165/202
See application file for complete search history.

(56) References Cited

U.S. PATENT DOCUMENTS

| 5,203,178 | A | * | 4/1993 | Shyu | G05D 19/02 62/228.4 |
|---|---|---|---|---|---|
| 7,743,617 | B2 | * | 6/2010 | Crane | F25B 49/02 62/215 |
| 8,740,103 | B2 | | 6/2014 | Major et al. | |
| 9,817,408 | B2 | * | 11/2017 | Meeuwsen | G05D 19/02 |
| 10,272,742 | B2 | | 4/2019 | Chavez Hernandez | |
| 2015/0039139 | A1 | * | 2/2015 | Meeuwsen | G05D 19/02 700/280 |
| 2015/0300684 | A1 | * | 10/2015 | Mehta | F24F 13/24 62/296 |
| 2016/0010924 | A1 | * | 1/2016 | Samoto | F28D 1/05391 165/173 |
| 2017/0320372 | A1 | * | 11/2017 | Aizawa | B60H 1/00521 |
| 2019/0047353 | A1 | * | 2/2019 | Williamson | B60H 1/00507 |

FOREIGN PATENT DOCUMENTS

JP    2003074945 A  *  3/2003

* cited by examiner

*Primary Examiner* — Tho V Duong
(74) *Attorney, Agent, or Firm* — Vivacqua Crane PLLC

(57) ABSTRACT

A vehicle HVAC system includes a component within a refrigerant system in a vehicle HVAC system, a vibration sensor that generates a vibration signal indicating a vibration of the component, and a controller in communication with the vibration sensor to receive the vibration signal and the refrigerant system. The controller is configured to determine whether the vibration signal corresponds to a predetermined vibration value and for adjusting the operation of the refrigerant system to minimize the system noise if the vibration signal corresponds to the predetermined vibration value.

5 Claims, 3 Drawing Sheets

VEHICLE HVAC CONTROL SYSTEM AND METHOD

FIELD

The present disclosure relates to a vehicle HVAC control system and method.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicle HVAC systems are used to control temperatures within cabins of vehicles. As an example, a blower is typically used to pass air through a heat exchanger and/or evaporator. Conditioned air output from the heat exchanger is provided to vents located within the vehicle cabin. Warm air is provided by passing a coolant flowing through the heat exchanger. Cool air is provided by passing a refrigerant through an evaporator. An issue with vehicle HVAC systems is that the components within these systems may generate undesirable noise that may then be detected by passengers in the vehicle. It is desirable to minimize and/or eliminate noises generated by vehicle HVAC systems.

SUMMARY

In an exemplary aspect, a vehicle HVAC system includes a component within a refrigerant system in a vehicle HVAC system, a vibration sensor that generates a vibration signal indicating a vibration of the component, and a controller in communication with the vibration sensor to receive the vibration signal and the refrigerant system. The controller is configured to determine whether the vibration signal corresponds to a predetermined vibration value and for adjusting the operation of the refrigerant system if the vibration signal corresponds to the predetermined vibration value.

In this manner, undesirable noises generated by a component in a refrigerant system of a vehicle HVAC system may be minimized and/or eliminated.

In another exemplary aspect, the controller is integrated into the component.

In another exemplary aspect, the vibration sensor is integrated into the component.

In another exemplary aspect, the component comprises a compressor.

In another exemplary aspect, the component comprises an expansion valve.

In another exemplary aspect, the vibration sensor is mounted on one of an evaporator, refrigerant control valve, refrigerant lineset, evaporator, HVAC module, HVAC duct, and instrument panel.

In another exemplary aspect, the controller adjusts operation of the refrigerant system by adjusting operation of one of a compressor, expansion valve, flow control valve, and HVAC module.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
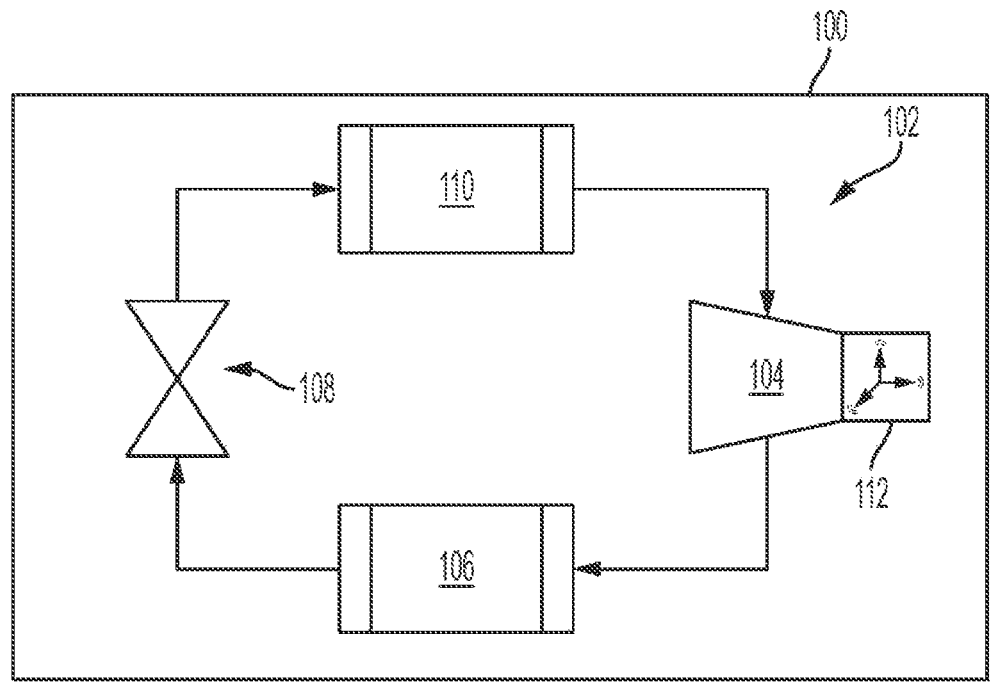
FIG. 1 is a schematic of a vehicle with a refrigerant portion of a vehicle HVAC system in accordance with an exemplary embodiment of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

An issue with vehicle refrigerant systems is the noise that is generated by components of that refrigerant system. For example, a compressor may "growl" when compressing refrigerant and that noise may resonate in other portions of the system. Other components may also generate undesirable noise. For example, an evaporator may generate noise. An evaporator may be housed within an HVAC module and the evaporator may be inadequately isolated from the HVAC module. In response, the HVAC module may act as an amplifier of the noise.

An expansion valve in the refrigerant system may also generate noise if the refrigerant flowing though the valve is not conditioned properly. For example, if the refrigerant includes any gas, then the refrigerant may generate noise as it passes through the valve.

The inventors of the present disclosure have invented a system and method for detecting noise generated by components within a vehicle refrigerant system and adjusting the operation of the refrigerant system to minimize and/or eliminate the noise. The invention stands in stark contrast to expensive conventional methods for addressing refrigerant system noise. Conventionally vehicle refrigerant system designers have had to try to make adjustments to the structure of the system. For example, supporting bracketry may have had to be added and/or strengthened to attenuate the noise and/or to change the resonant frequencies of the system components. However, physically changing components within the vehicle not only adds expense to the vehicle, but it does not entirely eliminate the generation of noise. Rather, the resonant frequencies of the system are merely changed and not eliminated. In stark contrast, the present invention detects the generation of noise and actively adjusts the operation of the refrigerant system to avoid those modes of operation where noise is generated. In this manner, refrigerant system noise may be significantly reduced and/or entirely eliminated at very low cost. Additionally, the efficiency and performance of the refrigerant system is not adversely affected by the present invention.

Referring now to the drawings, wherein like reference numbers correspond to like or similar components throughout the several figures, FIG. 1 is a schematic of a vehicle 100 with a refrigerant portion 102 of a vehicle HVAC system in accordance with an exemplary embodiment of the present disclosure. The refrigerant portion 102 includes a compressor 104, a condenser 106, an expansion valve 108, and an evaporator 110. Some of these components may be positioned within an HVAC module (not shown) that directs a flow of air across, for example, the condenser 106 for cooling the air and/or a heat exchanger (not shown) for heating the air. An exemplary HVAC module within a vehicle HVAC system is described in co-assigned U.S. Pat. No. 8,740,103, the detailed description of which is incorporated by reference herein in its entirety.

The compressor 104 within the refrigerant portion 102 of the vehicle 100 includes a vibration sensor 112. Conventional control signals may be received by the compressor 104 with which the compressor 104 responds to provide compression of a refrigerant in the refrigerant portion 102. In accordance with an exemplary embodiment of the present disclosure, the compressor 104 includes an integrated control system that receives the control signal and also receives a vibration signal that is generated by the vibration sensor 112. The compressor integrated control system may compare the vibration signal and determine whether to adjust the operation of the compressor 104 to minimize and/or eliminate noise that may be generated by operation of the compressor 104.

Figure 2:
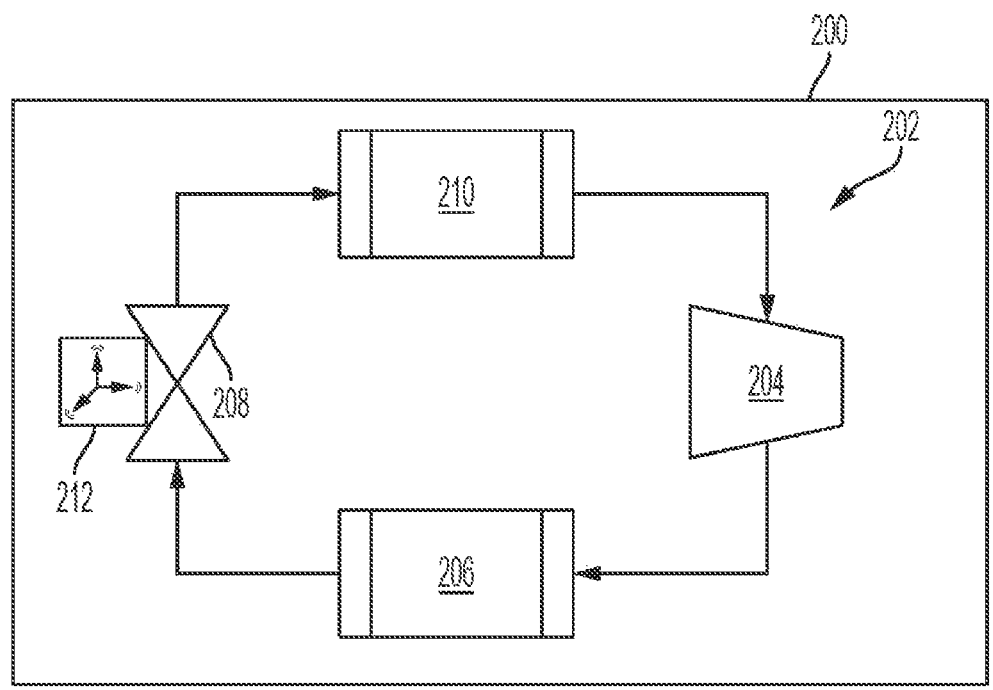
FIG. 2 is a schematic of a vehicle with a refrigerant portion of a vehicle HVAC system in accordance with another exemplary embodiment of the present disclosure.

FIG. 2 is a schematic of a vehicle 200 with a refrigerant portion 202 of a vehicle HVAC system in accordance with another exemplary embodiment of the present disclosure. The refrigerant portion 202 includes a compressor 204, a condenser 206, an expansion valve 208, and an evaporator 210. The expansion valve 208 within the refrigerant portion 202 of the vehicle 200 includes a vibration sensor 212. Conventional control signals may be received by the expansion valve 208 with which the expansion valve 208 responds to adjust the opening of the expansion valve 208 through which refrigerant passes in the refrigerant portion 202. In an exemplary embodiment, the expansion valve 208 may be an electronically actuated expansion valve. The expansion valve 208 includes an integrated control system that receives the control signal and also receives a vibration signal that is generated by the vibration sensor 212. The expansion valve integrated control system may compare the vibration signal and determine whether to adjust the operation of the expansion valve 208 to minimize and/or eliminate noise that may be generated by refrigerant flowing through the expansion valve 208.

Figure 3:
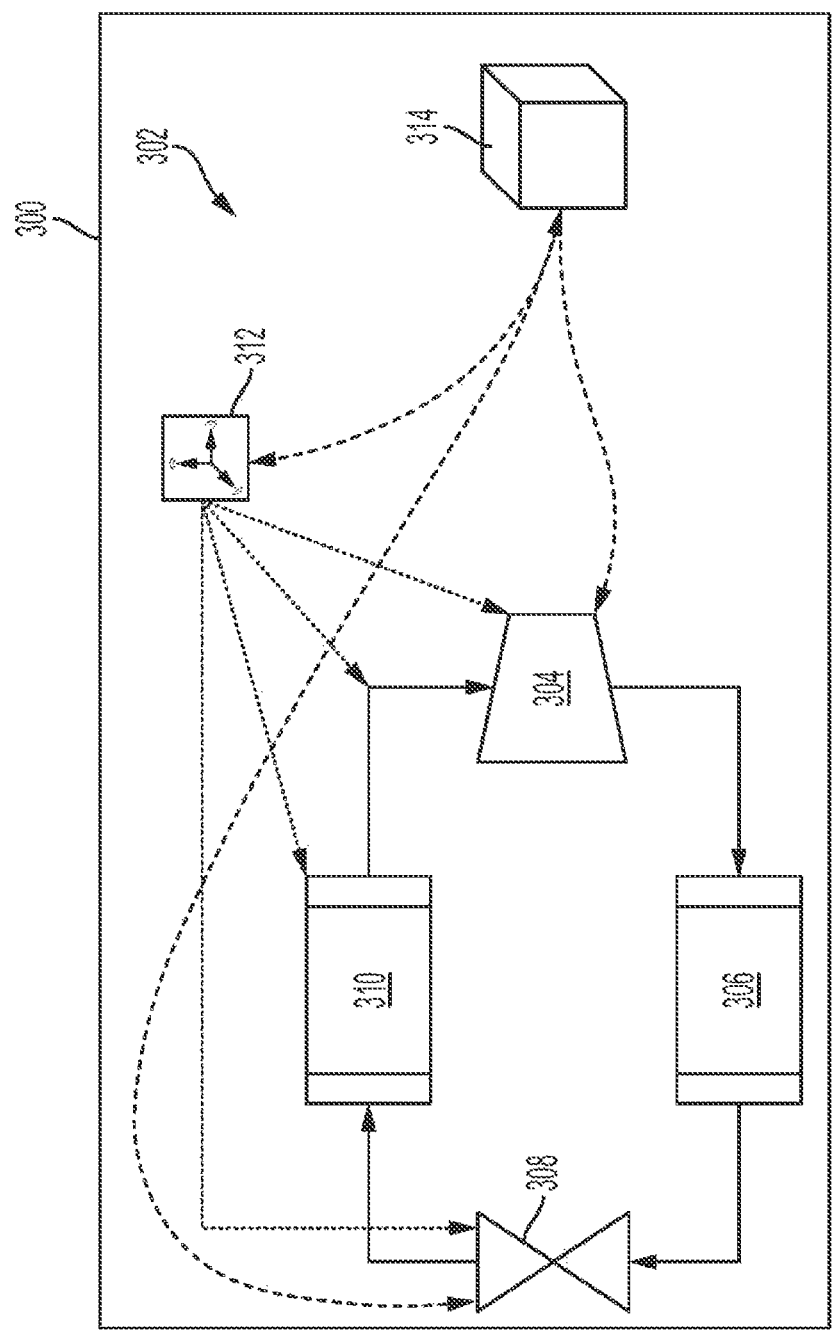
FIG. 3 is a schematic of a vehicle with a refrigerant portion of a vehicle HVAC system in accordance with yet another exemplary embodiment of the present disclosure.

FIG. 3 is a schematic of a vehicle 300 with a refrigerant portion 302 of a vehicle HVAC system in accordance with yet another exemplary embodiment of the present disclosure. The refrigerant portion 302 includes a compressor 304, a condenser 306, an expansion valve 308, an evaporator 310, a vibration sensor 312, and a controller 314. FIG. 3 illustrates that the vibration sensor 312 may be positioned in any of a plurality of positions within the refrigerant portion 302, such as, for example, on the compressor 304, the condenser 306, the expansion valve 308, the evaporator 310, an HVAC module housing (not shown), or the like without limitation and remain within the scope of the present disclosure. The controller 314 is in communication with each of the compressor 304 and the expansion valve 308 for providing control signals for operating each of them, respectively. The controller 314 is also in communication with the vibration sensor 312 for receiving vibration signals. The controller 314 may operate by comparing the vibration signal received from the vibration sensor 312 to values that may be stored in a look-up table and, if those signals correspond to values in the look-up table, then the controller 314 may provide an adjustment to a corresponding control signal to one or more of the compressor 304 and/or expansion valve 308 based upon a value in the look-up table. The look-up table may be created and populated based upon calibration work previously performed wherein vibration signals may have been measured and adjustments to control signals may have been determined which reduce and/or eliminate the vibration.

Figure 4:
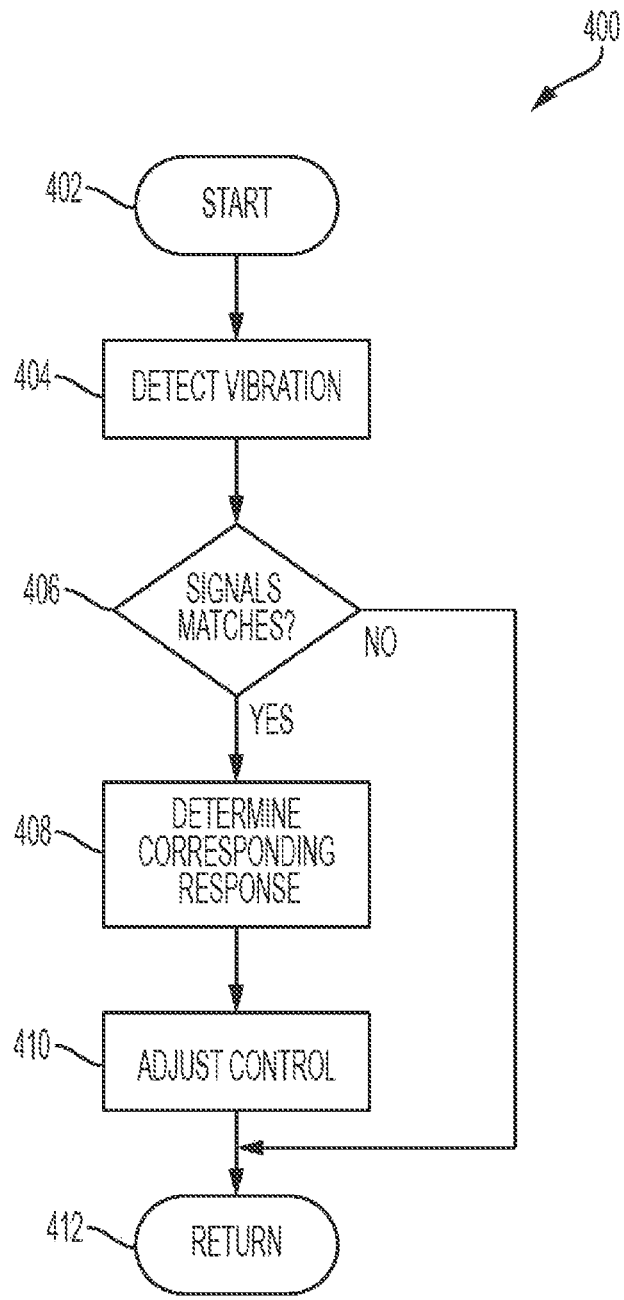
FIG. 4 is a flowchart of an exemplary control method for a refrigerant portion of a vehicle HVAC in accordance with the present disclosure.

FIG. 4 is a flowchart 400 of an exemplary control method for a refrigerant portion of a vehicle HVAC in accordance with the present disclosure. The method starts at step 402 and continues to step 404. In step 404, a vibration sensor generates a vibration signal that corresponds to the vibration of a component within the refrigerant system and the method continues to step 406. In step 406, a controller determines whether the vibration signal corresponds to a value stored in a look-up table. If, in step 406, the controller determines that the vibration signal does not correspond to a value stored in a look-up table, then the method continues to step 412. If, however, in step 406, the controller determines that the vibration signal corresponds to a value stored in a look-up table, then the method continues to step 408. In step 408, the controller determines the corresponding control signal adjustment from the look-up table and continues to step 410. In step 410, the controller adjusts a control signal based upon the corresponding control signal adjustment and continues to step 412. In step 412, the method returns to step 402.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for controlling an HVAC system in a vehicle that includes a component within a refrigerant system in the vehicle HVAC system, a vibration sensor, and a controller in communication with the vibration sensor, the method comprising:
providing the component within the refrigerant system in the vehicle HVAC system, wherein the component is a compressor;
providing the vibration sensor, wherein the vibration sensor is integrated into the compressor,
providing the controller in communication with the vibration sensor, wherein the controller is integrated into the compressor,
operating the vehicle HVAC system based on a setting provided by a vehicle operator during on-road use and adjusting the operation of the vehicle HVAC system in real-time by:

generating a vibration signal with the vibration sensor indicating a vibration of the component;
receiving the vibration signal in the controller;
determining whether the vibration signal corresponds to a predetermined vibration value; and
adjusting an operation of the refrigerant system if the vibration signal corresponds to the predetermined vibration signal.

2. The method of claim 1, wherein the controller includes a look-up table including a plurality of predetermined vibration values and corresponding refrigerant operation adjustment signals.

3. The method of claim 2, wherein the controller determines whether the vibration signal corresponds to a predetermined vibration value from the plurality of predetermined vibration values in the look-up table.

4. The method of claim 3, wherein the controller adjusts operation of the refrigerant system if the vibration signal corresponds to the predetermined vibration signal based upon a refrigerant operation adjustment signal that corresponds to the predetermined vibration signal in the look-up table.

5. The method of claim 1, further comprising ceasing the adjustment of the operation of the refrigerant system if the vibration signal no longer corresponds to the predetermined vibration value.

* * * * *